(12) United States Patent
Onishi

(10) Patent No.: US 8,758,692 B2
(45) Date of Patent: Jun. 24, 2014

(54) SYNTHESIS REACTION SYSTEM

(75) Inventor: Yasuhiro Onishi, Tokyo (JP)

(73) Assignees: Nippon Steel Engineering Co., Ltd., Tokyo (JP); Japan Oil, Gas and Metals National Corporation, Kanagawa (JP); Inpex Corporation, Tokyo (JP); Nippon Oil Corporation, Tokyo (JP); Japan Petroleum Exploration Co., Ltd., Tokyo (JP); Cosmo Oil Co., Ltd., Tokyo (JP)

( * ) Notice: Subject to any disclaimer, the term of this patent is extended or adjusted under 35 U.S.C. 154(b) by 0 days.

(21) Appl. No.: 12/733,784

(22) PCT Filed: Sep. 26, 2008

(86) PCT No.: PCT/JP2008/067464
§ 371 (c)(1),
(2), (4) Date: Mar. 18, 2010

(87) PCT Pub. No.: WO2009/041600
PCT Pub. Date: Apr. 2, 2009

(65) Prior Publication Data
US 2010/0239474 A1 Sep. 23, 2010

(30) Foreign Application Priority Data
Sep. 27, 2007 (JP) .................... 2007-252520

(51) Int. Cl.
*B01J 8/20* (2006.01)
*C07C 27/00* (2006.01)

(52) U.S. Cl.
USPC ........... 422/140; 422/145; 422/147; 422/234; 518/700

(58) Field of Classification Search
USPC ............................ 422/140, 234, 235; 518/700
See application file for complete search history.

(56) References Cited

U.S. PATENT DOCUMENTS

| 5,770,629 A | * | 6/1998 | Degeorge et al. ............. 518/700 |
| 5,900,159 A | | 5/1999 | Engel et al. |

(Continued)

FOREIGN PATENT DOCUMENTS

| EP | 1 390 445 | 6/2005 |
| JP | 59-330 | 1/1984 |

(Continued)

OTHER PUBLICATIONS

Machine translation and English abstract of JP 2006-022283 A (Jan. 2006).*

(Continued)

*Primary Examiner* — Jennifer A Leung
(74) *Attorney, Agent, or Firm* — Kenyon & Kenyon LLP

(57) ABSTRACT

There is provided a synthesis reaction system which synthesizes a hydrocarbon compound by a chemical reaction of a synthesis gas including hydrogen and carbon monoxide as main components, and a slurry having solid catalyst particles suspended in liquid and which extracts the hydrocarbon compound from the slurry. The synthesis reaction system includes a reactor main body which accommodates the slurry, a separator which separates the hydrocarbon compound included in the slurry from the slurry, a first flow passage which allows the slurry including the hydrocarbon compound to flow to the separator from the reactor main body, a second flow passage which allows the slurry to flow to the reactor main body from the separator, and a fluid supply nozzle which supplies a fluid toward at least any one of the separator, the first flow passage, and the second flow passage.

6 Claims, 2 Drawing Sheets

(56) References Cited

U.S. PATENT DOCUMENTS

| | | |
|---|---|---|
| 7,125,524 B2 | 10/2006 | Schweitzer et al. |
| 2003/0018089 A1 | 1/2003 | Schweitzer et al. |
| 2007/0014703 A1 | 1/2007 | Schweitzer et al. |

FOREIGN PATENT DOCUMENTS

| | | | |
|---|---|---|---|
| JP | 05-068869 | | 3/1993 |
| JP | 2000-506061 | | 5/2000 |
| JP | 2001-340747 | | 12/2001 |
| JP | 2004-511619 | | 4/2004 |
| JP | 2006022283 A | * | 1/2006 |
| WO | 02/31083 | | 4/2002 |
| WO | 02/096839 | | 12/2002 |

OTHER PUBLICATIONS

Machine translation and English abstract of JP 2001-340747 A (Dec. 2001).*

International Search Report dated Dec. 9, 2008 issued in corresponding PCT Application No. PCT/JP2008/067464.

Japanese Office Action dated Sep. 18, 2012, issued in corresponding Japanese Application No. 2009-534414, and an English translation thereof.

Extended European Search Report dated Aug. 28, 2013 issued in corresponding EP Application No. 08 833 959.3.

European Search Report dated Oct. 24, 2013 issued in corresponding EP Application No. 08 833 959.3.

* cited by examiner

SYNTHESIS REACTION SYSTEM

This application is a national stage application of International Application No. PCT/JP2008/067464, filed 26 Sep. 2008, which claims priority to Japanese Application No. 2007-252520, filed 27 Sep. 2007 which is incorporated by reference in its entirety.

TECHNICAL FIELD

The present invention relates to a synthesis reaction system for synthesizing the hydrocarbon compound by introducing a gas including hydrogen and carbon monoxide as main components into a slurry having solid catalyst particles suspended in liquid hydrocarbons.

BACKGROUND ART OF THE INVENTION

As a reaction system for a Fischer-Tropsch synthesis reaction (hereinafter called FT synthesis reaction) that generates a hydrocarbon compound and water by catalytic reaction from a synthesis gas which is mainly composed of hydrogen and carbon monoxide, a bubble column type slurry bed FT synthesis reaction system that carries out an FT synthesis reaction by introducing a synthesis gas into a slurry in which solid catalyst particles are suspended in a liquid hydrocarbon is available (for example, refer to Patent Documents 1 and 2 as mentioned below). Further, a hydrocarbon compound synthesized by the FT synthesis reaction is mainly utilized as a raw material for liquid fuel products such as naphtha (rough gasoline), kerosene and gas oil.

Further, as this bubble column type slurry bed FT synthesis reaction system, there is an external circulation type FT synthesis reaction system including a reactor main body which accommodates slurry, and a gas-supplying section which introduces synthesis gas into the bottom of the reactor main body, and an external circulation section which makes the catalyst slurry including a hydrocarbon compound synthesized within the reactor main body flow out from the reactor main body, separates the hydrocarbon compound from the catalyst slurry, and returns the catalyst slurry to the reactor main body again. In Patent Documents 1 and 2, a pump is used for the flow of the slurry through an external circulation section. However, if the pump, etc. is used, the performance of catalyst particles may degrade due to attrition.

Accordingly, in this configuration, when the synthesis gas introduced into the reactor main body ascends through the slurry, an upward flow (airlift) is generated in the reactor main body. Therefore, the circulating flow of the slurry is generated in the reactor main body in its vertical direction. Also, the flow of the slurry through the external circulation section is generated with the circulating flow of the slurry within the reactor main body.

PATENT DOCUMENT 1: US Patent Application, First Publication No. 2003/0018089
PATENT DOCUMENT 2: US Patent Application, First Publication No. 2007/0014703

DETAILED DESCRIPTION OF THE INVENTION

Problems to be Solved by the Invention

However, since the aforementioned flow of the slurry stops in a state where the synthesis gas is not introduced into the slurry, i.e., in a static state of the synthesis reaction system, a solid part of the slurry including the catalyst particles settles. Thus, there is a problem in that the solid part is apt to settle inside the external circulation section.

Particularly, when the synthesis reaction system is shut down due to external factors, such as an electrical power failure, adhesion, cohesion, bridging, etc. of the above solid part are apt to occur inside the external circulation section. Therefore, even if the slurry is restarted to flow again, it will take longer time until the synthesis reaction system is established to a stable operating state. As a result, there is a problem in that the production efficiency of liquid fuel products degrades.

The present invention has been made in view of such problems, and aims at allowing the state of a synthesis reaction system to transit to an operating state from a stopped state, reducing the transition time thereof, and improving the production efficiency of liquid fuel products, in the synthesis reaction system which carries out an FT synthesis reaction.

Means for Solving the Problems

The synthesis reaction system of the present invention is a synthesis reaction system which synthesizes a hydrocarbon compound by a chemical reaction of a synthesis gas including hydrogen and carbon monoxide as main components, and as slurry having solid catalyst particles suspended in liquid and which extracts the hydrocarbon compound from the slurry. The synthesis reaction system includes a reactor main body which accommodates the slurry; a separator which separates the hydrocarbon compound from the slurry; a first flow passage which allows the slurry including the hydrocarbon compound to flow to the separator from the reactor main body; a second flow passage which allows the slurry to flow to the reactor main body from the separator; and a fluid supply nozzle which supplies a fluid toward at least any one of the separator, the first flow passage, and the second flow passage.

In addition, the above fluid is desirably one that does not influence the chemical reaction of the synthesis gas with the slurry. For example, the fluid is preferably an inert gas, such as nitrogen or argon, etc. Further, the above fluid may be liquid fuel products, such as kerosene and gas oil.

In the synthesis reaction system of the present invention, in a case where the synthesis reaction system is started from a state where the synthesis gas is not supplied into the slurry, i.e., from a static state where the circulating flow of the slurry is not generated in the reactor main body, and is then established in an operating state where the circulating flow of the slurry is generated, it is desirable that a fluid is supplied to the separator, the first flow passage, or the second flow passage from the fluid supply nozzle. Thereby, since the flow of the fluid occurred by the circulating flow floats the solid part of the slurry which has settled or adhered in the separator, the first flow passage, or the second flow passage, the flow state of the slurry in the separator, the first flow passage, or the second flow passage can be promoted. Accordingly, smooth transition of the synthesis reaction system to an operating state from a static state is enabled, and the transition time thereof can be reduced.

Further, when the synthesis reaction system is shut down due to certain factors, and the circulating flow within the reactor main body has stopped, the fluid is supplied to the separator, the first flow passage, or the second flow passage from the fluid supply nozzle. Thereby, since the solid part of the slurry is kept from settling or adhering in the separator, the first flow passage, or the second flow passage, so that clogging of the separator, the first flow passage, and the second flow passage by the solid part of the slurry can be prevented, it becomes possible to restart the synthesis reaction system rapidly.

Further, the synthesis reaction system may further include a flow assist nozzle which allows the fluid to supply into the reactor main body to promote the flow of the slurry within the reactor main body.

In this case, when the synthesis reaction system is started to an operating state from a static state, the circulating flow of the slurry within the reactor main body is promoted by supplying the fluid into the reactor main body from the flow assist nozzle. Thus, it becomes possible to establish a steady circulating flow rapidly.

Moreover, in the synthesis reaction system, the fluid may be heated at least more than the precipitation temperature of a wax fraction included in the hydrocarbon compound.

In this configuration, when the synthesis reaction system is in a static state, the temperature of the slurry may become lower than the precipitation temperature of the wax fraction. As a result, even if the wax fraction of the hydrocarbon compound has precipitated inside the reactor main body, the separator, the first flow passage, and the second flow passage, the wax fraction can be heated by supplying the heated fluid to the external circulation nozzle or the reactor main body when the synthesis reaction system is started. For this reason, in a case where the fluid heated when the synthesis reaction system is shut down is supplied, cooling of the slurry can be prevented. Therefore, it becomes possible to prevent precipitation of the wax fraction. Further, even if the wax fraction has precipitated, it becomes possible to dissolve the precipitated wax fraction.

Accordingly, it enables to further reduce the time which is taken until the operating state where the wax fraction is melted perfectly after the synthesis reaction system is restarted can be further shortened.

Advantageous Affects of the Invention

According to the present invention, when the synthesis reaction system is started or stopped, the fluid is supplied to the separator, the first flow passage, or the second flow passage. Thereby, the time which is taken until the state of the synthesis reaction system transits to an operating state from a static state can be reduced. Therefore, the production efficiency of liquid hydrocarbons, and liquid fuel products using the liquid hydrocarbons as a raw material, can be improved.

DESCRIPTION OF THE REFERENCE SYMBOLS

1: SYNTHESIS REACTION SYSTEM
5: EXTERNAL CIRCULATION SECTION
10: REACTOR MAIN BODY
12: SLURRY
20: DISTRIBUTOR (SYNTHESIS GAS SUPPLYING SECTION)
50: FLOW ASSIST NOZZLE
60: FIRST SLURRY FLOW PASSAGE (FIRST FLOW PASSAGE)
64: STATIONARY SEPARATOR
65: THIRD PIPELINE (SECOND FLOW PASSAGE)
68, 69: FLUID SUPPLY NOZZLE
122: LIQUID HYDROCARBON (HYDROCARBON COMPOUND)
124: CATALYST PARTICLE

BEST MODE FOR CARRYING OUT THE INVENTION

Hereinafter, preferred embodiments of the present invention will be described with reference to FIGS. 1 to 2.

Figure 1:
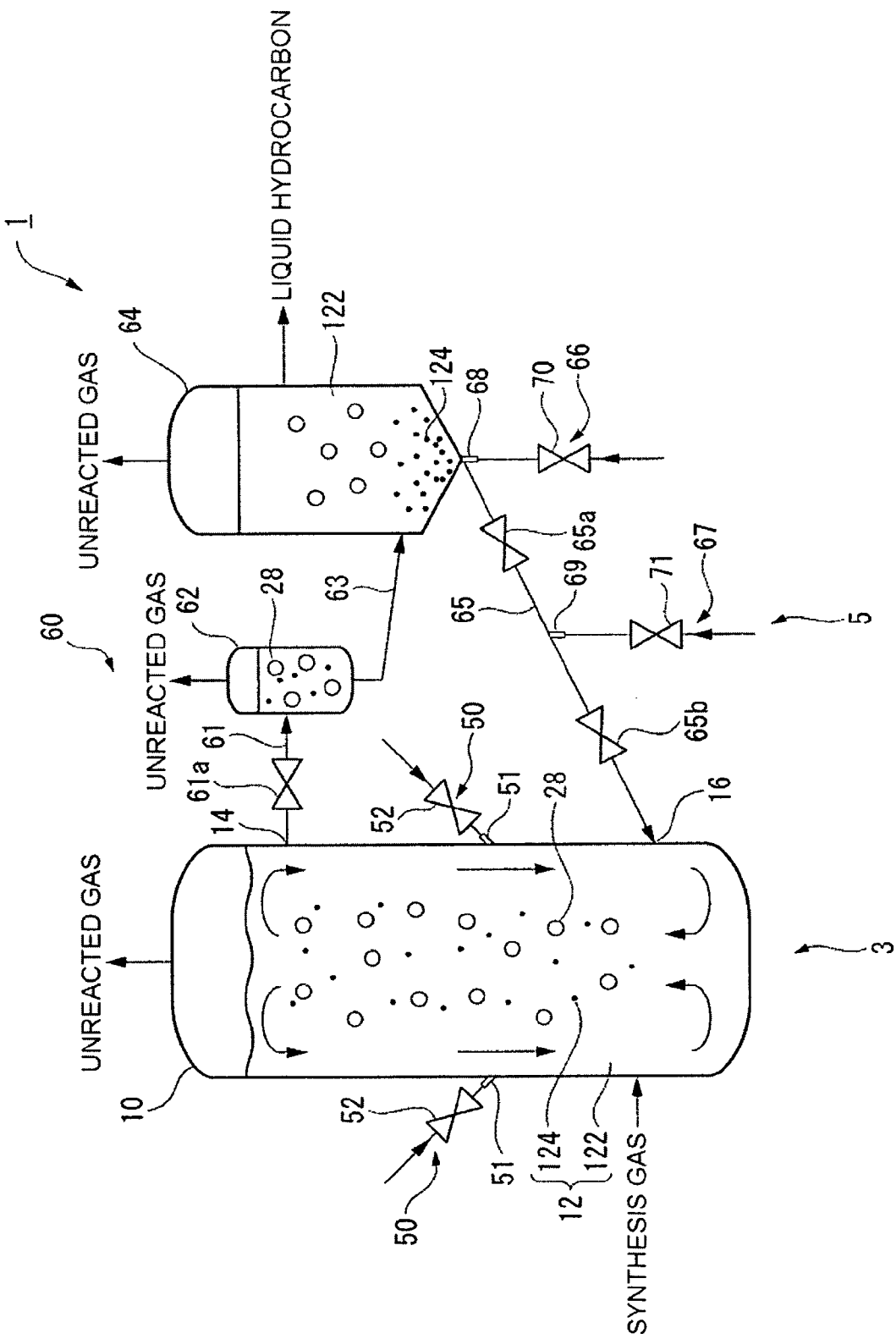
FIG. 1 is a schematic diagram showing the overall configuration of a synthesis reaction system according to an embodiment of the invention.

As shown in FIG. 1, a synthesis reaction system 1 according to the present embodiment is a bubble column type slurry bed FT synthesis reaction system, and includes a reactor 3 which causes the FT synthesis reaction, and an external circulation section 5 which extracts products of the FT synthesis reaction.

Figure 2:
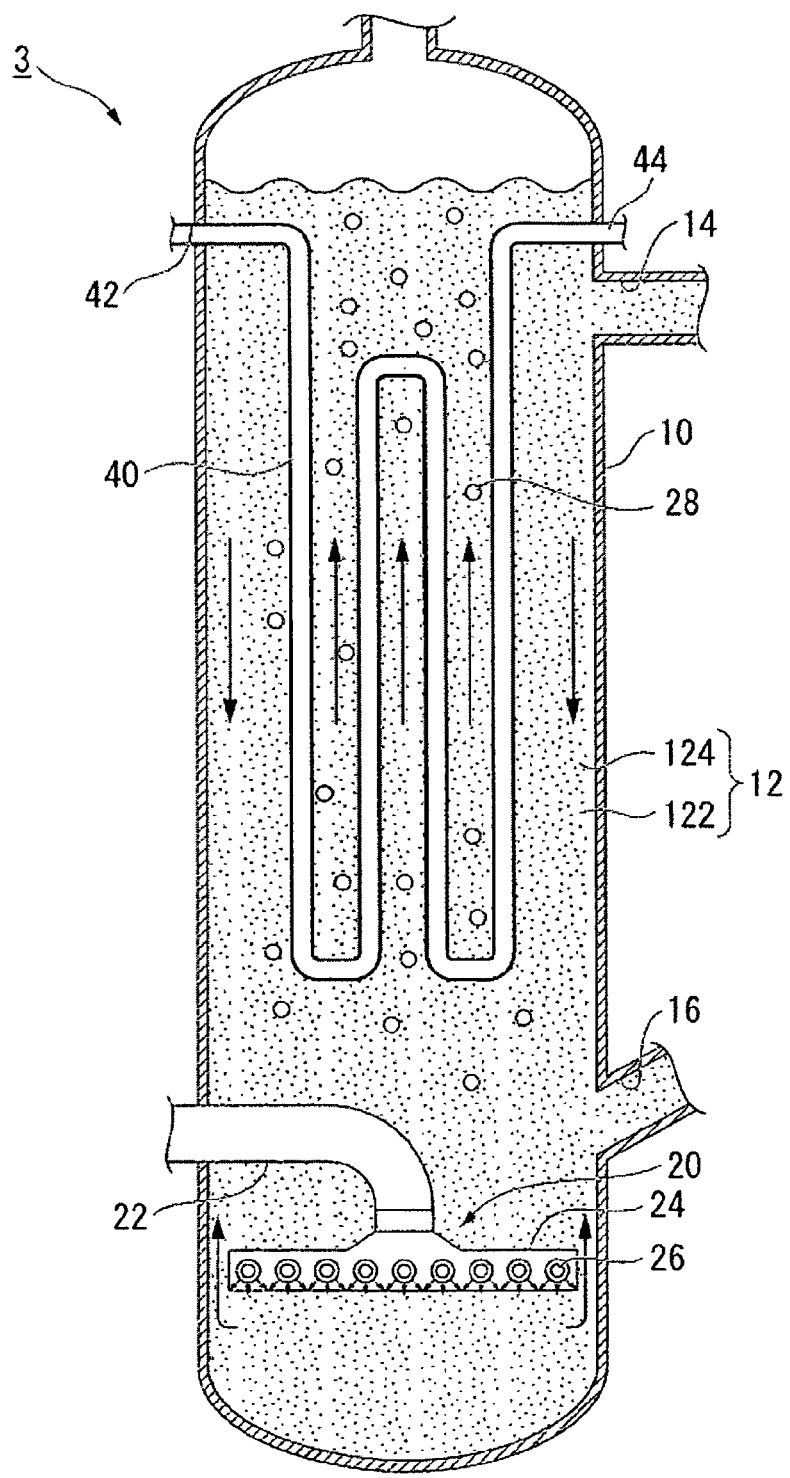
FIG. 2 is a longitudinal sectional view showing a reactor constituting the synthesis reaction system of FIG. 1.

As shown in FIGS. 1 and 2, the reactor 3 mainly includes a reactor main body 10, a distributor 20, a cooling pipe 40, and a flow assist unit 50.

The reactor main body 10 is a substantially cylindrical vessel made of metal, the diameter of which is about 1 to 20 meters, preferably about 2 to 10 meters. The height of the reactor main body 10 is about 10 to 50 meters, preferably about 15 to 45 meters. Slurry 12 having solid catalyst particles 124 suspended in liquid hydrocarbons (product of the FT synthesis reaction) 122 is accommodated inside the reactor main body 10. The reactor main body 10 is formed with a slurry outlet port 14 through which a portion of the slurry 12 is allowed to flow out to the external circulation section 5 from an upper portion of the reactor main body, and a slurry inlet port 16 through which the slurry 12 is allowed to flow into a lower portion of the reactor main body 10 from the external circulation section 5.

The distributor 20, which is an example of a synthesis gas supplying section according to the present embodiment, is disposed at the lower portion inside the reactor main body 10 to supply synthesis gas including hydrogen and carbon monoxide as main components into the slurry 12. The distributor 20 is composed of a synthesis gas supply pipe 22, a nozzle header 24 attached to a distal end of the synthesis gas supply pipe 22, and a plurality of synthesis gas supply nozzles 26 provided at a side portion of the nozzle header 24.

The synthesis gas supplied through the synthesis gas supply pipe 22 from the outside passes through the nozzle header 24 and is injected into the slurry 12 inside the reactor main body 10, for example, downward (that is, the direction shown by thin arrows in the drawing) from a synthesis gas supply port (not shown) provided at the lower portion of the synthesis gas supply nozzle 26 (the bottom of the reactor main body 10). Thus, the synthesis gas introduced from the distributor 20 into the slurry 12 is made into bubbles 28 and flows through the slurry 12 from the bottom to the top in the height direction (vertical direction) of the reactor main body 10. In the process, the synthesis gas is dissolved in the liquid hydrocarbons 122 and brought into contact with the catalyst particles 124, whereby a synthesis reaction of the liquid hydrocarbon (FT synthesis reaction) is carried out. In addition, in the present embodiment, the synthesis gas is injected downward. However, the synthesis gas may be injected upward of the reactor main body 10.

Further, the synthesis gas is introduced into the slurry 12 from the distributor 20 disposed at the lower portion inside the reactor main body 10. The synthesis gas introduced into the slurry ascends as bubble 28 inside the reactor main body 10. Thereby, inside the reactor main body 10, an upward flow (air lift) of the slurry 12 is generated at the center portion inside the reactor main body 10 and in the vicinity thereof (that is, in the vicinity of the center axis of the reactor main body 10), and a downward flow of the slurry 12 is generated in the vicinity of the inner wall of the reactor main body 10 (that is, in the vicinity of the inner peripheral portion). Thereby, as shown by the thick arrows in FIG. 2, a circulating flow of the slurry 12 is generated inside the reactor main body 10.

The cooling pipe 40 is provided along the height direction of the reactor main body 10 inside the reactor main body 10 to cool down the slurry 12 whose temperature has risen due to the heat generated by the FT synthesis reaction. The cooling pipe 40 may be formed so as to reciprocate a plurality of times (for example, to reciprocate two times in FIG. 2) vertically in the vertical direction, for example, by bending a single pipe as shown in FIG. 2. However, the shape and number of cooling pipes are not limited to the above shape and number, but may be such that the cooling pipes are evenly arranged inside the reactor main body 10 and contribute to uniform cooling of the slurry 12. For example, a plurality of cooling pipes having a double-pipe structure called a bayonet type may be arranged inside the reactor main body 10.

Cooling water (for example, the temperature of which is different by about −50 to 0° C. from the interior temperature of the reactor main body 10) introduced from the cooling pipe inlet 42 circulates through the cooling pipe 40. As the cooling water exchanges heat with the slurry 12 via the wall of the cooling pipe 40 in the process during which the cooling water circulates through the cooling pipe 40, the slurry 12 inside the reactor main body 10 is cooled down. A portion of the cooling water is discharged from the cooling-pipe outlet 44 as steam. In addition, the medium for cooling the slurry 12 is not limited to the cooling water as described above. For example, a straight chain and branched-chain paraffin, naphthenic hydrocarbon, olefin, low-molecular-weight silane, silyl ether, and silicone oil, etc., of $C_4$ to $C_{10}$ may be used as the medium.

As shown in FIG. 1, a plurality of flow assist units 50 are provided outside the reactor main body 10 so as to supply a fluid into the reactor main body 10 from the outside. Also, each flow assist unit 50 includes a flow assist nozzle 51 connected to an inner wall (peripheral wall portion) of the reactor main body 10, and the fluid is jetted toward the reactor main body 10 by this flow assist nozzle 51 so as to run along an inner wall surface of the reactor main body 10. Further, each flow assist unit 50 includes an opening/closing valve 52 which is arranged between a fluid supply source (not shown), and the flow assist nozzle 51 to control supply of the fluid, and the fluid is supplied into the reactor main body 10 by opening the opening/closing valve 52.

In addition, the fluid to be supplied into the reactor main body 10 from the flow assist nozzles 51 may be, for example, the same synthesis gas as one supplied by the distributor 20, or may be a gas (for example, an inert gas, such as nitrogen or argon) or a liquid (for example, liquid hydrocarbons, or liquid fuel products such as kerosene and gas oil, which are produced using the liquid hydrocarbons as a raw material) which does not influence the FT synthesis reaction. Further, either the gas or liquid mentioned above may be supplied or both may be supplied into the reactor main body 10 from the flow assist nozzle 51.

Further, in the present embodiment, the flow assist nozzle 51 is arranged between the reactor main body 10 and the opening/closing valve 52. However, for example, the flow assist nozzle may be arranged in the position where the opening/closing valve 52 is sandwiched along with the reactor main body 10. Moreover, although the flow assist nozzle 51 is provided in the position where the downward flow of the slurry 12 is promoted, the flow assist nozzle 51 may be provided, for example, in the position where the upward flow of the slurry 12 is promoted. That is, the flow assist nozzle 51 may be provided, for example, in the position where the fluid is jetted upward from near the central axis within the reactor main body 10.

As shown in FIG. 1, the external circulation section 5 mainly includes a degassing vessel 62 and a stationary separator 64.

The degassing vessel 62 is connected to the slurry outlet port 14 of the reactor main body 10 via a first pipe 61, and removes unreacted synthesis gas (bubbles 28), etc. included in the slurry 12 which has flowed in from the reactor main body 10. Further, at a middle portion of the first pipe 61, a dividing valve 61a which opens and closes the first pipe 61 is disposed. By operating the dividing valve 61a, inflow of the slurry 12 from the reactor main body 10 to the degassing vessel 62 can be controlled. Also, a lower portion of the degassing vessel 62 is connected to the stationary separator 64 via a second pipe 63. Accordingly, a first flow passage 60 for allowing the slurry 12 to flow to the stationary separator 64 from the reactor main body 10 is constituted by the first pipe 61, the degassing vessel 62, and the second pipe 63.

Further, a lower portion of the stationary separator 64 is connected to the slurry inlet port 16 of the reactor main body 10 via a third pipe 65. That is, in the present embodiment, the third pipe 65 forms a second flow passage for allowing the slurry 12 flow to the reactor main body 10 from the stationary separator 64. Also, at a middle portion of this third pipe 65, a dividing valve 65a which opens and closes the third pipe 65 and a return valve 65b are disposed so as to separate each other.

In addition, in the above configuration, the second pipe 63 preferably inclines downward toward the stationary separator 64 from the degassing vessel 62, and, the third pipe 65 preferably inclines downward toward the reactor main body 10 from the stationary separator 64. Thereby, the slurry 12 is able to flow toward the stationary separator 64 from the degassing vessel 62 or toward the reactor main body 10 from the stationary separator 64, by gravity, without using other power source, such as a pump.

Also, the aforementioned stationary separator 64 makes the catalyst particles 124 precipitate to the lower portion of the stationary separator 64 by utilizing the characteristic that the specific gravity of the catalyst particles 124 included in the slurry 12 which has flowed in from the degassing vessel 62 is greater than that of the liquid hydrocarbons 122, and thereby a portion of the liquid hydrocarbons 122 is separated from the catalyst particles 124 in the slurry 12. Also, by opening the dividing valve 65a and the return valve 65b which are provided on the third pipe 65, the slurry 12 including more catalyst particles 124 flows into the reactor main body 10 from the lower portion of the stationary separator 64.

In addition, in the above separation processing, for example, a diffuser which reduces the flow rate of the slurry 12 may be provided at the tip of the second pipe 63 located on the side of the stationary separator 64 so that the flow of the slurry 12 may not be caused within the stationary separator 64 by the flow of the slurry 12 which goes toward the stationary separator 64 from the degassing vessel 62.

Further, in the stationary separator 64 configured in this way, similarly to the degassing vessel 62, unreacted synthesis gas can be removed.

Also, at the lower portion of the stationary separator 64, a first fluid supply unit 66 which supplies the fluid toward the upper portion within the stationary separator 64 from the lower portion is provided. The first fluid supply portion 66 includes a first fluid supply nozzle 68 connected to the lower portion of the stationary separator 64, and an opening/closing valve 70 provided between the fluid supply source (not shown) and the first fluid supply nozzle 68.

Further, a second fluid supply unit 67 which supplies the fluid into the third pipe 65 is provided at the middle portion of the third pipe 65 located between the dividing valve 65a and the return valve 65b. The second fluid supply unit 67, similarly to the first fluid supply unit 66, includes a second fluid supply nozzle 69 connected to the third pipe 65, and an opening/closing valve 71 provided between the fluid supply source (not shown) and the second fluid supply nozzle 69.

Accordingly, in each of the fluid supply units 66 and 67, the fluid can be supplied to the stationary separator 64 or the middle portion of the third pipe 65 from each of the fluid supply nozzles 68 and 69 by opening the opening/closing valves 70 and 71.

Although the fluid to be supplied into the stationary separator 64 or the third pipe 65 from the fluid supply nozzles 68 and 69 includes, for example, an inert gas, such as nitrogen or argon, liquid hydrocarbons and liquid fuel products such as kerosene and gas oil, which are produced by using the liquid hydrocarbons as a raw material, arbitrary gases or liquids which do not influence the FT synthesis reaction can be used. Further, either the gas or liquid mentioned above may be supplied and both may be supplied into the stationary separator 64 and the third pipe 65 from the fluid supply nozzles 68 and 69.

In addition, in the present embodiment, each of the fluid supply nozzles 68 and 69 is arranged between the stationary separator 64 or the third pipe 65, and the opening/closing valves 70 or 71. However, for example, each of the fluid supply nozzles may be arranged in the position where the opening/closing valve 70 or 71 is sandwiched along with the stationary separator 64 or the third pipe 65.

Next, the operation of the synthesis reaction system 1 configured in this way will be described.

In a state where the synthesis reaction system 1 is operated, synthesis gas is supplied into the accommodated slurry 12 such that its liquid level is located higher than the slurry outlet port 14, and accordingly, the circulating flow of the slurry 12 is generated inside the reactor main body 10. Further, in this state, the liquid hydrocarbons 122 are synthesized by the chemical reaction with the synthesis gas and the catalyst particles 124. Moreover, the heat produced by this chemical reaction is cooled down by the cooling pipe 40.

Further, in the operating state of the synthesis reaction system 1, a portion of the circulating flow of the slurry 12 is circulated to the slurry inlet port 16 via the first pipe 61, the degassing vessel 62, the second pipe 63, the stationary separator 64, and the third pipe 65 from the slurry outlet port 14. That is, in this operating state, the dividing valve 61a of the first pipe 61, the dividing valve 65a of the third pipe 65, and the return valve 65b are opened.

Further, in this operating state, the opening/closing valves 52, 70, and 71 of the flow assist unit 50 and the fluid supply units 66 and 67 are closed, and thus, supply of the fluid into the reactor main body 10, the stationary separator 64, and the third pipe 65 is not performed.

Then, when the operation of the above-mentioned synthesis reaction system 1 is shut down due to some arbitrary factors, such as an electrical power failure, and the circulating flow within the reactor main body 10 has stopped, the dividing valve 61a of the first pipe 61 and the return valve 65b of the third pipe 65 are closed, thereby dividing a circulation pathway of the slurry 12 composed of the reactor main body 10 and the external circulation section 5. Further, the opening/closing valve 70 or 71 of each of the fluid supply units 66 and 67 is opened to supply the fluid to the lower portion of the stationary separator 64 and the middle portion of the third pipe 65 from each of the fluid supply nozzles 68 and 69.

Further, in the synthesis reaction system 1, the synthesis reaction system 1 is started from a state where the synthesis gas is not supplied into the slurry 12, i.e., from a static state where the circulating flow of the slurry 12 is not generated in the reactor main body 10. Then, if this start is returned to the above-mentioned operating state, the synthesis gas is supplied into the slurry 12 within the reactor main body 10. Further, before or after this supply of the synthesis gas or simultaneously therewith, the opening/closing valve 52 of the flow assist unit 50 is opened to supply the fluid into the reactor main body 10 from the flow assist nozzle 51. Thereby, the circulating flow of the slurry 12 within the reactor main body 10 is promoted, so that steady circulating flow can be established in a short time.

Meanwhile, in the static state of the synthesis reaction system 1, a solid part of the slurry 12 may precipitate and adhere within the external circulation section 5, especially toward the lower portion of the stationary separator 64 or the downstream of the third pipe 65.

Thus, in the synthesis reaction system 1, before or after this supply of the synthesis gas or simultaneously therewith, the opening/closing valve 70 or 71 of each of the fluid supply units 66 and 67 is opened to supply the fluid to the lower portion of the stationary separator 64 and the middle portion of the third pipe 65 from each of the fluid supply nozzles 68 and 69. Thereby, since the aforementioned flow of the fluid floats the solid part of the slurry 12 which has precipitated or adhere in the lower portion of the stationary separator 64 or the third pipe 65, the flow of the slurry 12 within the external circulation section 5 can be promoted.

According to the synthesis reaction system 1 related to the present embodiment, when the synthesis reaction system 1 is stopped, clogging of the lower portion of the stationary separator 64 and the third pipe 65 can be prevented by supplying the fluid into the lower portion within the stationary separator 64, or into the third pipe 65. Further, when the synthesis reaction system 1 is started, the fluid is supplied into the lower portion within the stationary separator 64, or the third pipe 65, thereby floating the solid part of the slurry 12 which has precipitated or stuck in the lower portion of the stationary separator 64, or the third pipe 65, so that the flow of the slurry 12 within the external circulation section 5 can be promoted. Accordingly, when the synthesis reaction system 1 is started, the time which is taken until the state of the synthesis reaction system 1 transits to an operating state from a static state can be reduced. As a result, the production efficiency of the liquid hydrocarbons 122 and liquid fuel products by using the liquid hydrocarbons as a raw material can be improved.

In addition, in the above embodiment, when the synthesis reaction system 1 is shut down, or when the synthesis reaction system 1 is started, the fluid heated to a higher temperature than the melting point (precipitation temperature: about 100° C.) of a wax fraction (mainly $C_{21}$ or more) included in the liquid hydrocarbons 122 may be supplied to the reactor main body 10, the lower portion of the stationary separator 64, and the third pipe 65 from the flow assist nozzle 51 or each of the fluid supply nozzles 68 and 69.

That is, in a case where the fluid heated when the synthesis reaction system 1 is shut down is supplied, cooling of the slurry 12 can be prevented. Therefore, precipitation of the wax fraction can be prevented. Further, in a case where the fluid heated when the synthesis reaction system 1 is started is supplied, in the synthesis reaction system 1 in a static state, it becomes possible to heat wax by the heat of the fluid even if the temperature of the slurry 12 becomes lower than the precipitation temperature of a wax fraction, and the wax fraction has precipitated within the reactor main body 10 or the external circulation section 5. Therefore, it becomes possible to dissolve the wax. Accordingly, the time which is taken till the operating state where the wax is melted after the synthesis reaction system is started can be further reduced.

Further, in the above embodiment, the fluid supply units 66 and 67 are provided in the lower portion of the stationary separator 64 and in the middle portion of the third pipe 65. However, the fluid supply units 66 and 67 just have to be provided at least in arbitrary positions of the external circulation section 5. For example, the same fluid supply units 66 and 67 as those of the above embodiment may be provided in the lower portion of the degassing vessel 62 and in the middle portion of the second pipe 63. It is to be noted herein that it is more preferable that the fluid supply units be provided in portions where a solid component of the slurry 12 including a number of catalyst particles 124 tends to precipitate or adhere like the lower portion of the stationary separator 64, and the like, in the external circulation section 5, similarly to the above embodiment.

Moreover, in the above embodiment, the flow assist unit 50 and the fluid supply units 66 and 67 include the opening/closing valves 52, 70, and 71. However, they just have to include the flow assist nozzle 51 and the fluid supply nozzles 68 and 69.

Further, in the reactor 3, the synthesis gas is introduced into the slurry 12 from the distributor 20. However, for example, other gases, such as nitrogen gas, may be blown into the slurry as long as they generate a circulating flow of the slurry 12.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

The present invention relates to a synthesis reaction system which synthesizes a hydrocarbon compound by a chemical reaction of a synthesis gas including hydrogen and carbon monoxide as main components, and slurry having solid catalyst particles suspended in liquid and which extracts the hydrocarbon compound from the slurry. The synthesis reaction system includes a reactor main body which accommodates the slurry; a separator which separates the hydrocarbon compound included in the slurry from the slurry; a first flow passage which allows the slurry including the hydrocarbon compound to flow to the separator from the reactor main body; a second flow passage which allows the slurry to flow to the reactor main body from the separator; and a fluid supply nozzle which supplies a fluid toward at least any one of the separator, the first flow passage, and the second flow passage.

According to the synthesis reaction system of the present invention, the production efficiency of hydrocarbon compounds, and liquid fuel products including the hydrocarbon compounds as a raw material can be improved.

The invention claimed is:

1. A synthesis reaction system used to synthesize a hydrocarbon compound by a chemical reaction of a synthesis gas including hydrogen and carbon monoxide as main components, and a slurry having solid catalyst particles suspended in liquid and which extracts the hydrocarbon compound from the slurry, the synthesis reaction system comprising:
   a reactor main body which accommodates the slurry;
   a separator which separates the hydrocarbon compound included in the slurry from the slurry;
   a first flow passage which allows the slurry including the hydrocarbon compound to flow to the separator from the reactor main body;
   a second flow passage whose inlet port is connected to a lower section of the bottom of the separator, and which allows the slurry to flow to the reactor main body from the separator;
   dividing valves provided to the first and second passages and which are driven so as to close the first and second passages when a normal operation of the system is stopped,
   a first fluid supply nozzle which is connected to the lower section of the bottom of the separator, and which is configured to upwardly-supply a fluid into the separator through the inlet port of the second flow passage when the normal operation of the system is stopped; and
   a second fluid supply nozzle which is connected to a middle portion of the second flow passage, and which is configured to supply the fluid into the second flow passage when the normal operation of the system is stopped.

2. The synthesis reaction system according to claim 1, further comprising a flow assist nozzle connected to an inner wall (peripheral wall portion) of the reactor main body which supplies the fluid into the reactor main body to promote the flow of the slurry within the reactor main body.

3. The synthesis reaction system according to claim 1, further comprising a third fluid supply nozzle which is connected to the first flow passage that supplies a fluid into the first flow passage.

4. The synthesis reaction system according to claim 2, further comprising an opening/closing valve arranged between a fluid supply source and the flow assist nozzle to control the supply of the fluid.

5. The synthesis reaction system according to claim 1, further comprising
   an opening/closing valve arranged between the fluid supply source and the first fluid supply nozzle; and
   an opening/closing valve arranged between the fluid supply source and the second fluid supply nozzle;
   wherein the opening/closing valves are configured to be closed during the normal operation of the system, and the opening/closing valves are configured to be opened when the normal operation of the system is stopped.

6. A method which synthesizes a hydrocarbon compound by a chemical reaction of a synthesis gas including hydrogen and carbon monoxide as main components, and a slurry having solid catalyst particles suspended in liquid using the synthesis reaction system according to claim 1, wherein
   the fluid is heated to at least more than the precipitation temperature of a wax fraction included in the hydrocarbon compound.

* * * * *